(12) United States Patent
Ayntrazi

(10) Patent No.: US 7,391,127 B2
(45) Date of Patent: Jun. 24, 2008

(54) RENEWABLE ENERGY WAVE PUMP

(76) Inventor: Shamil Sami Ayntrazi, 8037 Trevor Pl., Vienna, VA (US) 22182

( * ) Notice: Subject to any disclaimer, the term of this patent is extended or adjusted under 35 U.S.C. 154(b) by 0 days.

(21) Appl. No.: 10/984,004

(22) Filed: Nov. 9, 2004

(65) Prior Publication Data

US 2006/0097520 A1    May 11, 2006

(51) Int. Cl.
  *F03B 13/10* (2006.01)
(52) U.S. Cl. ............................... 290/53; 290/42; 290/52
(58) Field of Classification Search .................. 290/53, 290/42, 52
  See application file for complete search history.

(56) References Cited

U.S. PATENT DOCUMENTS 4,398,095 A * 8/1983 Ono ............................ 290/53
5,842,838 A * 12/1998 Berg ........................... 417/331
6,388,342 B1 * 5/2002 Vetterick et al. .............. 290/53

* cited by examiner

*Primary Examiner*—Darren Schuberg
*Assistant Examiner*—Iraj A Mohandesi

(57) ABSTRACT

A renewable energy electric power generating system consisting of Renewable Energy Wave Pumps, located under water, anchored to the sea bed, auto regulating to variable sea elevations and undulation heights, efficient, simple construction and resistant to storms, operate by using the law of conservation of energy to change, a large quantity of water at low head found in a surface undulation, into a lower water quantity at a much higher head, collecting this high head water into a piping network and a common header anchored to the sea bed, provided with a stand pipe and reservoir, and feeds directly into a hydro-turbo generator located on or off shore to produce renewable cheap electric power with zero emissions and independent of oil prices, optimizing land use for power plants, and providing a navigation-safe and a free Floating Break Water Structure for shore line protection

1 Claim, 6 Drawing Sheets

* Data shown for 4-meter high Undulation
* Float, cylindrical 1.5 m dia x 1.5 m high
* Pump ID 0.20 m
* Float Max Uplift 2,650 kg, (90 meters)
* Pump Peak Output 0.45 kW for 1.2 m high 8.16 kW Undulationn
* Pump Peak Output 8.04 kW for 4.0 m high 90.72 kW Undulation
* A 1,500 m wide by 15 m long can produce between 6 and 68 MW
* 1.3 cents, Cost per kWH ELEVATION   Scale: 0  100  200 cm

PLAN VIEW

RENEWABLE ENERGY WAVE PUMP

Periodic undulations in an expanse body of water are a renewable energy source having both potential and kinetic energy in the form of a large volume of fluid at a small head (undulation height). The idea is to change this energy to a usable form. Using the law of conservation of energy, this large volume of fluid undulation is exchanged by a small volume of fluid pulled up to a much higher level, thus pulling out part of the fluid undulation energy.

The apparatus proposed for this energy exchange is herein called a Renewable Energy Wave Pump-REWP. Installing a field of REWP's up to 10 in line with apparent path of the fluid undulation would pull out and level pulses of energy up to ninety percent of the undulation energy.

Installing fields of REWP's up to 1,500 across the apparent path of the fluid undulation, collecting this fluid in a piping network with suction and discharge control valves, and discharging into a hydro-turbine, may produce power of up to 100 MW. Depending upon the fluid undulation height and durations, an energy exceeding 300,000 MWH per year may be generated at a cost of 1.3 US cents per KWH with zero fuel consumption and zero emissions, compared to a US average cost of 5.37 cents per KWH.

LISTING OF TABLES

Figure 1:
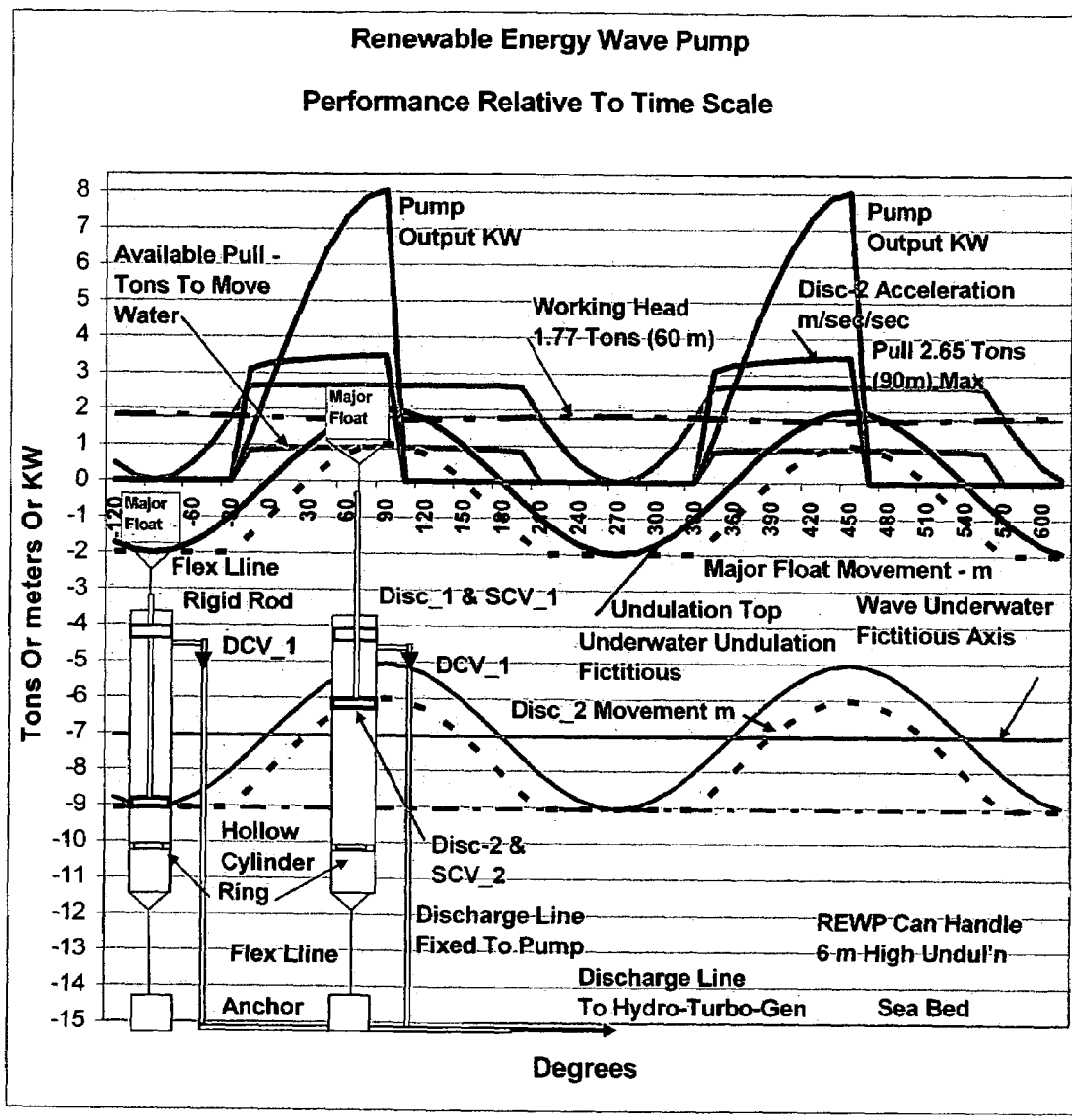
FIG. 1 REWP Performance and Patent Cover
FIG. 2 REWP Elevation View
FIG. 3 REWP Plan View
FIG. 4 REWP Schematic Flow Diagram
FIG. 5 REWP System Plan View
FIG. 6 REWP System Elevation View

Table 1 REWP data for undulations up to 2.5 meters high
Table 2 REWP power generation and undulation height
Table 3 Electricity Price per Kilowatt-hour
Table 4 Comparative data for electric power generation

CROSS-REFERENCE TO RELATED APPLICATIONS—Listed by USPTO

| US-6,388,342 | May 2002 | Vattrick et al | 290/53 |
| US-US005842838A | December 1998 | Berg | 417/331 |
| US-4398095 | August 1983 | Ono | 290/53 |

The above do not resemble the REWP system as proposed under this application.

Although many devices had been invented, none compares with this invention as to simplicity, efficiency, auto-regulation to variable sea elevations and undulation heights, and to economy. References are principles of hydraulic engineering.

FIELD OF THE INVENTION

The present invention refers to a method and apparatus for electric power generation from a renewable energy source namely, periodic sea undulations. It proposes an apparatus and system for converting the up and down motion of a surface water undulation into a pull up force that drives a deep water Renewable Energy Wave Pump, together with a piping system that collects the pumped water and channels it to produce useful energy.

A feasibility study is provided comparing conventionally produced electricity prices per KWH with that produced using the Renewable Energy Wave Pump.

BACKGROUND OF THE INVENTION

The available renewable energy in the seas and oceans, the cost of new power plants, the rising costs of fuel and the need of environment control: CO2 and other pollutants emission to the atmosphere and shoreline protection all dictate investigating and developing new sources of renewable energy.

"The oceans cover a little more than 70 percent of the Earth's surface. This makes them the world's largest solar energy collector and energy storage system. According to the World Energy Council, the global energy available from undulation energy conversion is two trillion Watt Hours/year. Tapping just 0.2 percent of this energy would satisfy current global demand for electricity."[1].

Anothny T. Jones, Ph.D.

During the next 20 years, experts foresee a need for 1,500 GW of additional electric power supply to meet new power demand. This equals to 15,000 power plants that are each 100 MW. It represents building for the next twenty years 100 MW power plants at the rate of 750 per year, 62.5 power plants per month or 2.1 power plants per day.

The fuel consumption for these power plants is estimated at 59 million barrels of oil per day. CO2 release to the atmosphere per year is estimated at 2.2 billion tons per year. The world Bank estimates that the developing countries alone will need to spend 100 billion US$ each year for the next 30 years, installing new power plants, most of which will be in the equatorial Zone.

Hence, switching to alternate energy is urgently needed. Among the alternate energy resources, undulation energy is considered as one of the most promising alternate energy source that has high concentration factor compared to wind and solar, and high availability factor (day & night) compared to Solar energy.

Figure 2:
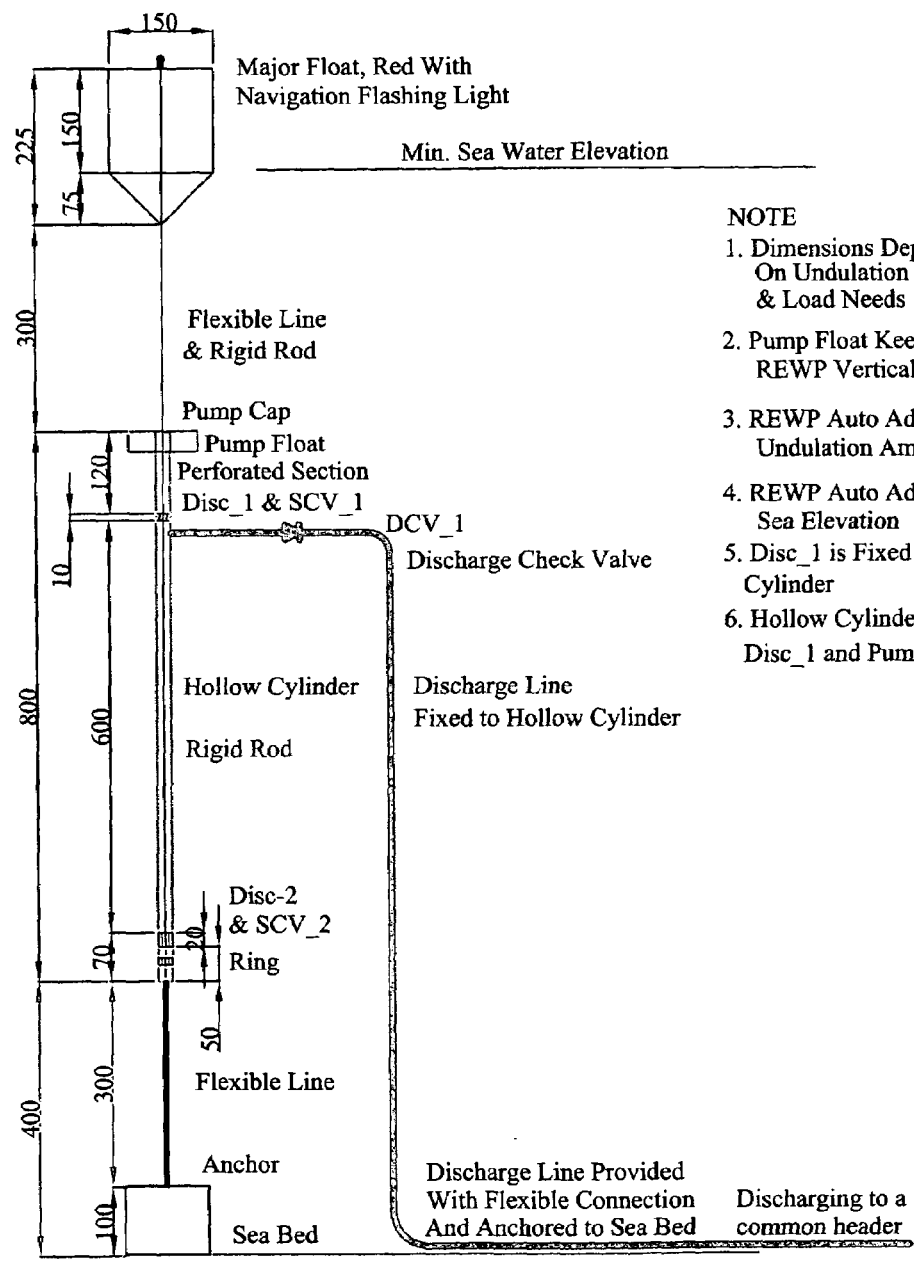
Figure 3:
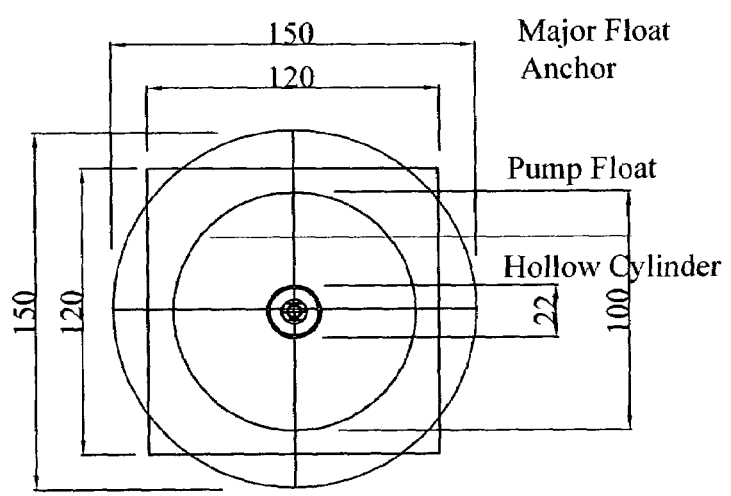

Civilizations can be tied to, indeed equated to energy utilization. America consumes nearly a quarter of the world power supply. That is 4% of the population consumes 25% of world power.

a. The material of the REWP could be any material suitable for marine installation, high abrasion resistance and has enough strength to withstand the forces acting on its elements, including those under storm conditions.

b. The dimensions of the individual REWP elements are variable and depend upon site conditions such as: low and high sea water elevations.

c. Undulation heights, required wave pump output, load requirements as to type of load and total output.

d. The example below shows a typical installation with different REWP elements and their respective dimensions.

e. All dimensions are shown in centimeters.

f. MAJOR FLOAT; cylindrical, red color, totally closed, with an outside diameter of 150 cm, a height of 150 cm and a wall thickness of 2 cm.

g. NAVIGATION RED WARNING LIGHT; (water tight) installed on top of the major float and powered from the power plant through a cable suitable for marine installation run along and fixed to the REWP discharge piping.

h. FLEXIBLE CABLE; connects bottom of the major float with the top of the REWP rigid rod having a length of 300 cm, suitable for marine installation and capable of withstanding a working tensile force of 3,000 kilograms.

i. HOLLOW CYLINDER; with an inside diameter of 20 cm and a wall thickness of 1.5 cm and a length of 800 cm, capable of withstanding a working internal pressure of 88,000 kg per square meter, i.e. 125 psi. or a water head of 87 meters; Shown under drawings by FIG. 2, elevation view and FIG. 3, plan view. The section of the hollow cylinder under the cap and above Disc__1 & SCV__1 is perforated to allow fluid to fill in the hollow cylinder on the downward motion of the major float and allow SCV__1 to open.

j. RIGID ROD; solid, with an outside diameter of 5 cm and a length of 800 cm, capable of withstanding a working tensile force of 3,000 kilograms.

k. Disc__2; cylindrical, solid, with an inside diameter of 20 cm, and a height of 20 cm and includes a suction check valve SCV__2 to allow entry of water on the downward stroke of the pump Disc__2. Disc__2 is fixed to the REWP rigid rod with a means to withstand a minimum working vertical force of 3,000 kg. Disc__2 moves up and down inside the REWP Hollow Cylinder.

l. PUMP CAP; cylindrical, solid, with an outside diameter of 20 cm, an inside diameter of 5 cm and a height of 10 cm, solidly fixed to the inside of the REWP casing. The plug and its fixing are capable of withstanding an upward working force of 3,000 kg. The REWP rigid rod freely moves inside the Pump Cap, m. Disc__1 with its SCV__1, and Disc__2 with its SCV__2 act as suction valves on the downward motion of the major float and as check valves on the upward motion of the major float as shown under drawings FIGS. 1 & 2.

n. PUMP FLOAT; inside diameter 23 cm, outside diameter 70 cm, a height of 70 cm and a wall thickness of 1 cm. This float provides an upward lift of 240 kg to keep the REWP in vertical position and limit its horizontal swing.

o. FLEXIBLE LINE; connects the bottom of the REWP with the anchor block resting on the seabed, with a length of 300 cm, suitable for marine installation and capable of withstanding a working tensile force of 3,000 kilograms.

p. DISCHARGE TUBE; 7.5 cm diameter equipped with a 7.5 cm discharge check valve. It is run vertically downward, fixed to the wave pump casing, provided with quick coupling and flexible pipe for connection to the discharge header that is run and anchored to the seabed.

q. DISCHARGE HEADER; has a diameter of 10 cm, collects REWP discharge water from adjacent rows of REWP and transfers water to the main header.

r. MAIN HEADER; collects the water from main headers and transfers it to the common header.

s. COMMON HEADER; collects the water from the main headers and discharges directly into the hydro-turbo-generator set. It is provided with automated by pass valve to discharge water back into the sea thus by-passing the turbine.

t. STAND PIPE; connected between the common header and an elevated reservoir, if and where utilized.

u. ANCHOR; reinforced concrete, suitable for marine installation, 120×120×100 cm (L×W×H), total weight 3,600 kg, fixed to bottom of the REWP by a flexible line capable of withstanding a working tensile force of 3,000 kg.

v. ANCHOR AND THRUST BLOCKS; provided to fix the discharge lines, headers, main headers and common header to the sea bed and to resist forces developed by change of direction of water flow in the pipes.

w. HYDRO-TURBO-GENERATOR SET; meeting requirements of water flow, water head and electrical power output.

STATEMENT REGARDING FEDERALLY SPONSORED RESEARCH OR DEVELOPMENT

Not Applicable

REFERENCE TO SEQUENCE LISTING, A TABLE, OR A COMPUTER

Not Applicable

PROGRAM LISTING

Not Applicable

COMPACT DISK

Not Applicable

APPENDIX

Not Applicable

History

The first patent on wave energy usage was filed about 400 years ago. This device was just a barge connected by a long lever with a water pump. It was never built because of technical difficulties.

Although many wave energy devices had been invented, only a small proportion have been tested and evaluated. Furthermore, only a few have been tested at sea, in ocean waves, rather than in artificial wave tanks.

A wave energy converter may be placed in the ocean in various possible situations and locations. It may be floating or submerged completely in the sea, or it may be located on the shore or on the seabed in relatively shallow water. A converter on the seabed may be completely submerged, it may extend above the sea surface, or it may be a converter system placed on an offshore platform. Apart from wave-powered navigation buoys, however, most of the prototypes have been placed at or near the shore.

As of the mid-1990s, there were more than 12 generic types of wave energy systems. Some systems extract energy from surface waves others extract energy from pressure fluctuations below the water surface or from the full wave. Some systems are fixed in position and let waves pass by them, while others follow the waves and move with them. Some systems concentrate and focus waves, which increases their height and their potential for conversion to electrical energy.

As of the mid-1990s, wave energy conversion was not commercially available in the United States. The technology was in the early stages of development and was not expected to be available within the near future due to limited research and lack of federal funding As of 1995, 685 kilowatts (kW) of grid-connected wave generating capacity is operating worldwide. This capacity comes from eight demonstration plants ranging in size from 20 kW to 350 kW. None of these plants are located in California, although economic feasibility studies have been performed for a 30 MW wave converter to be located at Half Moon Bay. Additional smaller projects have been discussed at Fort Bragg, San Francisco and Avila Beach. There are currently no firm plans to deploy any of these projects.

Interest in renewable sources of energy was revived after the first serious oil crisis, about 30-years ago. Then more advanced schemes were developed as listed under achievements below.

DETAILED DESCRIPTION OF THE INVENTION

When you see an undulation go by, you think of it as the water moving. Well, it's not the water it's the kinetic and potential energy within the water that's making it seem to move. The energy within the undulation has a high flow (O) at a low head (h). The idea is to pull out this energy to a low (O) at a higher head (H) and collect enough Q suitable for operating a large hydro-turbo-generator. A series of deep-water REWP's are installed along the path of the undulation, each pulling out a portion of the undulation energy until ninety percent of total undulation energy is pulled out and changed to a lower Q at a higher head.

Figure 4:
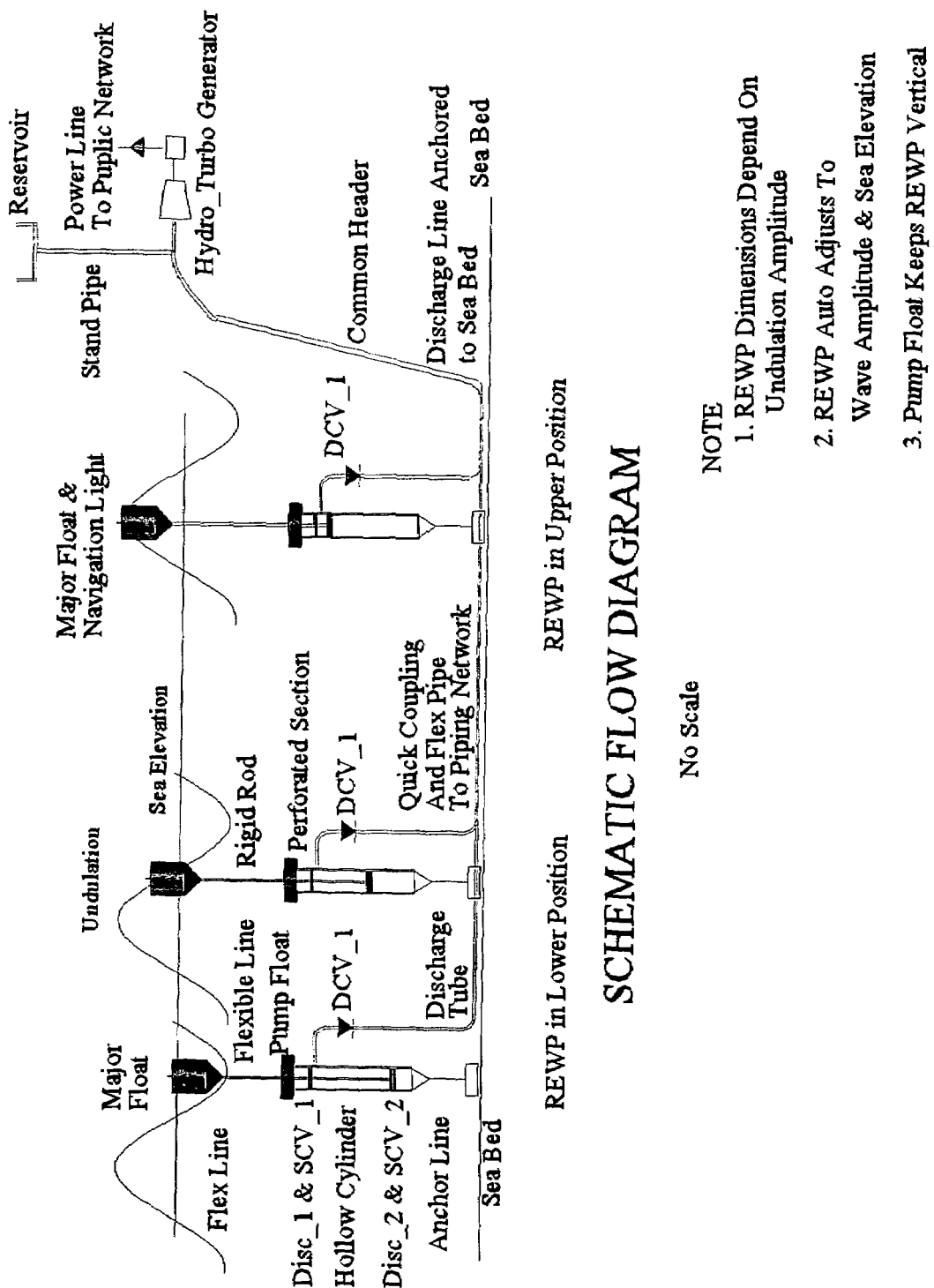

As the undulation has an apparent motion from left to right, the following actions take place as shown in FIG. 4; Schematic Flow Diagram, page 4/6:

1. The Major Float oscillates up and down following the contour of the undulation.
2. The Major Float has a flexible connection to the REWP rigid rod to allow for limited horizontal swings and to absorb the undulation shock, if any.
3. The REWP has a Pump Float fixed at its top section to keep it in the vertical position and to minimize horizontal swings.
4. The Major Float and the pump rigid rod auto regulate to the variable water elevations due to ebb/tide action and to seasonal sea elevation changes.
5. The REWP is anchored to the seabed through a flexible anchor line to keep it in place.
6. Red flashing warning light is installed on top of the Major Float for navigation safety. The Major Float color is red.
7. As the Major Float is submerged by the undulation an upward force is developed proportional to the submerged volume of the float.
8. The Major Float upward pull force is transmitted to the REWP Disc_2 through a flexible line and a rigid rod. This upward pull lifts the water in the pump upward, forces the discharge check valve DCV_1 to open, allowing the water in the REWP to flow through the discharge header.
9. When the REWP reaches its uppermost position and starts to fall down on the lee side of the undulation, the discharge check valve DCV_1 closes.
10. The high pressure of the water in front of the discharge check valve DCV_1, plus the weight of the water inside the REWP and the weight of Disc_2 and its rigid rod, force the REWP Disc_2 to start moving down, thus opening the suction check valves SCV_1 and SCV_2 and allowing sea water to fill the REWP, making it ready for the next incoming undulation front and repeat the cycle.
11. The suction Inlet Check Valves are part of the pump Disc_1, and of Disc_2, as shown by SCV-1 and SCV-2 under FIGS. 1 & 2. Filter screens are provided to prevent the ingress of floating materials and/or small fish into the REWP.
12. A portion of the potential and kinetic energy from each incoming undulation is pulled out by the REWP. REWP's are installed along the path of the undulation in such a number as to fully pull out most of the energy from the undulation and leveling it all along the duration of the undulation cycle.
13. A piping system collects the discharge of the REWPs and directs it to a hydro-turbo-generator set. The hydro turbine converts the energy of the water to mechanical energy that in turn drives a directly coupled electric generator.
14. The discharge of the common header may have other types of utilization such as: pumping water to a water reservoir, to a swimming pool or other utilization.
15. The electric energy of the generator is locally distributed to local consumers, or synchronized and connected to the public electric utility network.
16. A standpipe and a reservoir are provided to store excess water at a higher head for use at peak loads.
17. The turbo-generator set may be fixed on the shore, or it may be installed on a floating platform near the shore. The use of a floating platform is possible as the surface water behind the REWPs is calm, since the wave pumps had pulled out at least 90% of the undulation energy.
18. Shoreline protection is achieved as a byproduct, since most of the undulation energy had been pulled out from the incoming undulations.
19. Floating Break Water Structure is achieved as a byproduct, since most of the undulation energy had been pulled out from the incoming undulation.
20. The travel of the REWP piston is proportional to the undulation height. The head to which the water is pulled up is proportional to the ratio of the major float area to that of the wave pump net piston area. A proper choice of the pump can be made to cover incoming variable undulation heights between one and six meters (3.28 to 19.67 feet).
21. The REWP can also cover variable sea elevations due to ebb/tide and seasonal changes. All that happens is to auto adjust the downward travel of the REWP Disc_2, which affects the quantity of water being pumped through the discharge tube, at the same TDH.
22. The dimensions and arrangement of major floats act to amplify the height of the incoming undulation. As the undulation water moves upward, its area of travel is restricted by the presence of the major floats. Therefore, the water is forced to flow upward along the sides of the major float resulting in additional submergence of the major float. This amplification of the undulation height is more obvious on the second row of wave pumps.
23. To minimize construction costs
    a. The REWP anchors at the seabed may be sets of continuous section each measuring 1,575×120×100 cm.
    b. The discharge pipes fixed to the sea bed may be flexible piping.
    c. The REWP power plant is made as part of another power plant using fuel or gas as the primary source of energy. This would minimize maintenance and would provide dependable electric power source.
24. Environmental Impact
    a. Limit shoreline erosion, as the surface water behind the wave pumps is calm.

b. Does not disturb sea life or sea utilization. The area is 1,000 to 1,500 meters long, 20.26 meters wide, extending downward to the seabed. The underwater structures are hollow cylinders that have an outside diameter of 23 cm spaced at 225 cm, and have a minimum depth of 13.25 meters or more.

c. The area at the sea surface is a series of red major floats clearly visible during the day; and a series of red flashing navigation warning lights clearly visible at night.

25. CALCULATION
   a. Undulation power density ranges between 1 and 110 KW per one (1) meter of undulation front. It increases directly with the square of the undulation height.
   b. The following example shows the forces acting on the REWP. The configuration of the REWP and the dimensions of each element depend on site conditions, power and load requirements. The variables are tides, seasonal low and high sea water elevations, undulation height, and frequency, contour of the seabed, type of load and power requirements.

Major Float: Hollow Cylinder, 150 cm diameter, 150 cm high.

Volume of Major Float=$Pi*r^2*h=3.1416*(0.75)^2*1.5=2.6507$ m3

Major Float pull up: $2.6507*1,000=2,650.7$ kg vertical

Major Float movement: 0-600 centimeters up/down depending on undulation height.

Weight of major float, Disc__2 and REWP rigid rod: 80 kg

Net Pull up force is $(2,650.7-80)=2,570.7$ kg.

REWP rigid rod outside diameter: (d) 5 centimeters

REWP inside diameter: (D) 20 centimeters

The net area of the REWP is:

$$(\tfrac{1}{4})Pi*(D^2-d^2)=(\tfrac{1}{4})Pi*(0.04-0.0025)=0.029453 \; m2.$$

Therefore, the REWP Disc__2 as dimensioned above can lift water up to a maximum height (H) of 87.28 meters, $$\text{Where: } H*(0.029453*1,000)=2,570.7$$

Note that the height of water column between the top of Disc__2 and the sea surface water is developed by the head of water column acting on the bottom of Disc__2. Therefore, the head (H) is independent of the depth of the Disc__2 of the REWP. This is equivalent to a power output of: 8.44 Kilowatts per one pass for an undulation front of 1.50 meters and an undulation height of two (2) meters. Undulation energy, based on a 1.5 meters undulation front is as shown in Table 1 below:

Table 1    REWP data for undulations up to 2.5 meters high, undulation front 150 centimeters
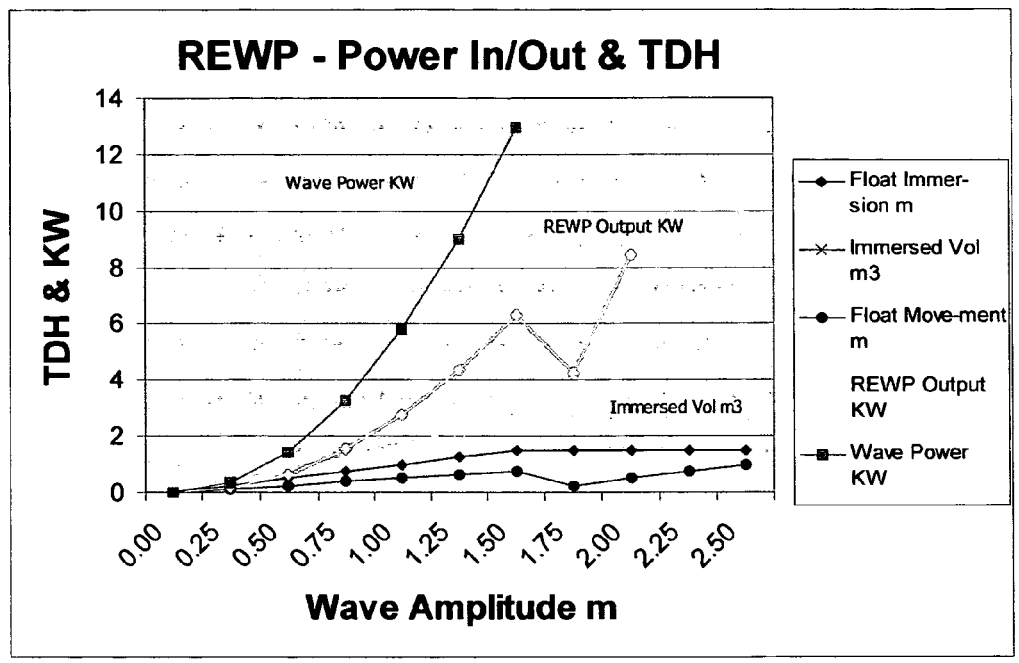

FIG. 4 REWP Schematic Flow Diagram shows a set of eight (8) REWP's installed along the path of the incoming surface undulations. Each of these REWP's would pull out a bit of energy from the incoming surface undulation, until most of the potential and kinetic energy had been pulled out.

The actual configuration of the system is to allow some head to overcome friction losses between the REWP Disc_2 and the hydro-turbo inlet, and produce an additional head to move the fluid in the discharge piping network equivalent to V2/2*g.

As the major float cannot pull out all the energy in the undulation in a single pass, more than one REWP should be installed to pull out approximately ninety percent of the total energy from the undulation. The number of REWP's installed along the path of the incoming undulation would be determined from actual field data, depth of water and the height of the undulations.

Installing a field of REWP 1,500 meters wide in the apparent path of periodic undulations would produce 20 to 100 megawatts of electric power depending on undulation height and duration. In addition, this field of REWP's would act as a free Floating Breakwater Structure.

Power Generation

Under the above conditions, an REWP system can develop up to 100 MW of electric power for undulation heights up to four (4) meters, with a Major Float radius of (75) centimeters and an REWP field 2,250 meters wide.

Higher power outputs are possible, if undulation heights above three (3) meters prevail for long durations. The annual amount of power generated in Kilowatt-hours depends upon the hourly durations of the different heights of the undulations. That is; how many hours per year each type of undulation height persists.

Undulations with sizeable heights occur between latitudes 30 and 60 degrees, North and South, with the highest occurring at the North West coast of California.

A conventional 450 MW power plant operates at full capacity for 6,000 hours out of 8,760 hours per year. That is, it operates 68.5% at full capacity and can generate a maximum of 2,700,000,000 KWH per year. This is due to load characteristics, maintenance shutdown and due to provision of reserve power capacity.

A 100 MW REWP system power plant operating at full capacity for 3,000 hours or 34.25% of the time can easily develop 300,000,000 KWH per year.

Renewable Energy Wave Pump

The capacity of the REWP system depends upon the available waterfront, undulation heights and duration. Waterfronts of the order of 1,000 meters or more to be utilized for REWP power plants connected to public utilities, or where they are part of a power plant. Smaller waterfronts can be used for standalone REWP power generation according to load requirements.

Where prevailing undulations are of low heights, then Major Floats with larger diameter to be utilized to take care of the low height incident undulations. A matching or still better same REWP could be selected taking into consideration the characteristics of the hydro-turbine driving the generator.

Ideally, a REWP system should be installed as an expansion to an existing power plant, or as an additional power source in a new power plant. This would greatly decrease installation costs and would result in very low maintenance and operation costs. The design of the REWP covers the following:

Undulation Incidence and Power

The power generated depends upon undulation heights, incidence and duration. For low undulation heights, the Major Float diameter may be increased. However, this would result in large forces and power outputs when high height undulations occur. For this, a close matching between undulation durations and heights, REWP and hydro turbo-generator characteristics is required.

The charts below represent a Major Float diameter of 150 cm, a REWP of 20 cm internal diameter and undulation heights up to 300 cm. For existing systems, the following represent costs per one (1) KWH for variable undulation power levels per one meter of undulation width:

| Undulation Power Level KW Per 1 - meter undulation width | Location | US$/KWH |
|---|---|---|
| 11 | Denmark | 0.164 |
| 16 | Denmark | 0.131 |
| 24 | Denmark | 0.103 |
| 46 | Portugal | 0.066 |
| 60 | Faeroe Islands | 0.061 |
| 75 | UK | 0.056 |

TABLE 2

REWP power generation and undulation heights

| Wave Height m | Electrical Power KW | Incidence Per Year Hours | Power Generated Mwhours | Incidence Per Year Hours | Power Generated Mwhours | Incidence Per Year Hours | Power Generated Mwhours |
|---|---|---|---|---|---|---|---|
| Wave Power Level KW | | | 11.8 | | 16.4 | | 34.5 |
| 1 | 3.2 | 5,006 | 20.0 | 4,103 | 13.0 | 1,515 | 4.8 |
| 2 | 14.2 | 1,939 | 38.8 | 1,982 | 28.1 | 2,663 | 37.8 |
| 3 | 34.2 | 742 | 34.9 | 944 | 32.2 | 1,875 | 63.5 |
| 4 | 64.8 | 249 | 21.9 | 445 | 28.4 | 1,296 | 82.7 |
| >4.5 | 78.0 | 130 | 13.0 | 33 | 25.7 | 1,463 | 114.1 |
| Totals | | 8,066 | 95.2 | 7,804 | 127.6 | 8,795 | 303.0 |
| Wave Power Level KW | | | 19.9 | | 25 | | 3.74 |
| 1 | 3.2 | 3,764 | 11.9 | 3,846 | 16.8 | 1,077 | 3.4 |
| 2 | 14.2 | 2,200 | 31.2 | 2,488 | 49 | 2,759 | 39.2 |
| 3 | 34.2 | 1,032 | 35.3 | 964 | 45.7 | 1,875 | 64.1 |
| 4 | 64.8 | 536 | 34.2 | 41 | 3.6 | 1,226 | 78.2 |
| >4.5 | 78.0 | 634 | 49.4 | 139 | 13.9 | 1,831 | 142.8 |

TABLE 2-continued

REWP power generation and undulation heights

| Wave Height m | Electrical Power KW | Incidence Per Year Hours | Power Generated Mwhours | Incidence Per Year Hours | Power Generated Mwhours | Incidence Per Year Hours | Power Generated Mwhours |
|---|---|---|---|---|---|---|---|
| | Totals | 8,166 | 162.1 | 7,478 | 184.1 | 8,769 | 327.8 |

Figure 5:
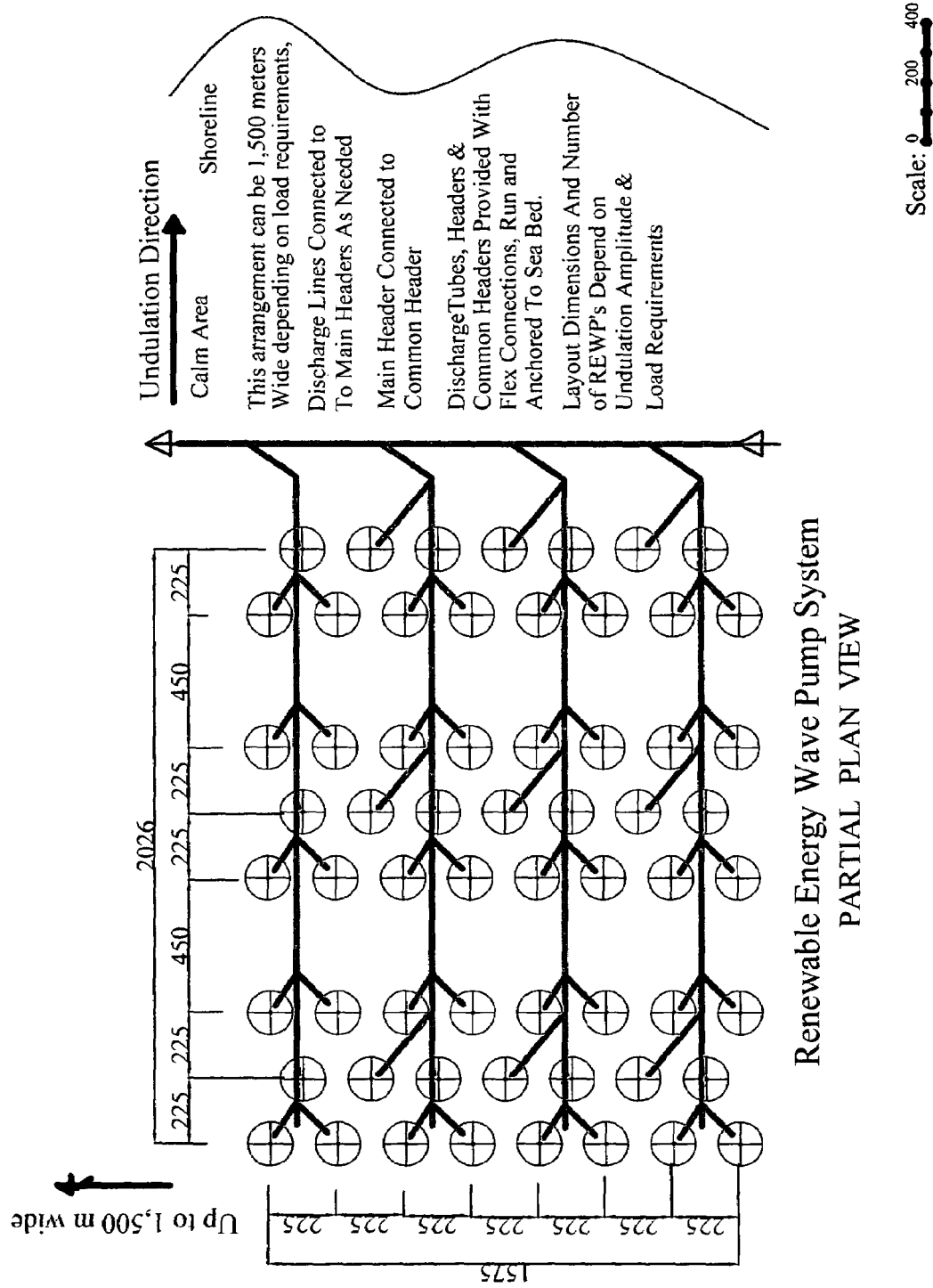
Figure 6:
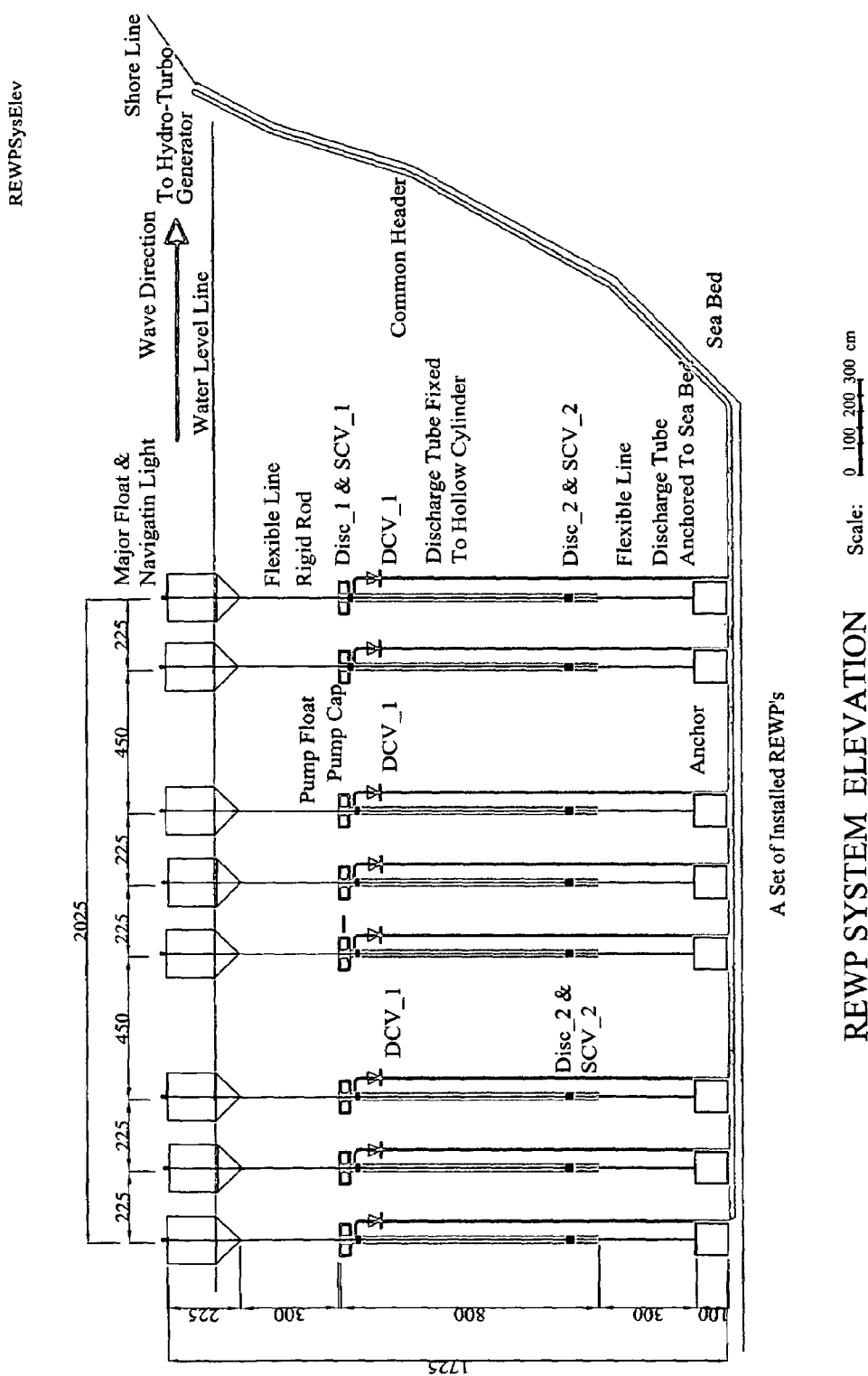

Storm Conditions
- Storm conditions with no limitation on undulation height, or wind speed. The Major Float design limits the upward pull irrespective of undulation heights.
- A set of REWP with a length of eight (8) meters installed along the apparent path of undulations, would pull out most of the Kinetic and Potential energies of undulations up to six (6) meters high.
- To pull out energy from undulations exceeding six (6) meters height, the REWP length to be increased above eight (8) meters and the set of the REWP to be increased above eight (8) REWP's along the path of the undulation as shown by FIG. 5 REWP System Plan View.
- Covers surface sea water elevation variations up to five (5) meters.
- Auto regulates to variable sea water elevation and to undulation heights.

Safety to Navigation and Environment

The following represents a general solution for the calculation of energy costs, installation per KW, fuel and maintenance per KWH.

| Electricity price Per KWH = (1/E) * K[r + 1/2n] + M/E + F/E | | |
|---|---|---|
| K | US$/KW | Capital cost |
| E | KWH/KW | Annual production (full load hours) |
| F/E | US$/KWH | Fuel cost |
| r | % | Interest rate per annum |
| n | years | Return period on investment |
| M/E | US$/KWH | Maintenance cost |

Table 3 Electricity Price per Kilowatt-hour, shows actual data from a recent power plant with different fuels used and for different types of turbines. Depending upon type of turbines and fuel used, the average cost per KWH varies between 5.113 and 6.581 US cents, for the 450 MW electric power plants.

TABLE 3

Electricity Price per Kilowatt-hour

| Item | | Description | RRST-FO 1% 3 ST | RRST-NG 3 ST | CCGT-NG 2 GT + 1 ST | REWP-Hydro T | REWP-Hydro T |
|---|---|---|---|---|---|---|---|
| | | Plant Capacity - MW | 450 | 450 | 450 | 50 | 50 |
| | | Total installation cost US$ Million | 495 | 495 | 270 | 20 | 20 |
| | | Fuel cost/year (2005) US$ Million | 117.88 | 117.88 | 105.14 | 0 | 0 |
| | | Operation and Maintenance Per Year US$ Million | 7.82 | 5.57 | 4.57 | 0.381 | 0.381 |
| | | GWH Generated Per Year | 2,700 | 2,700 | 2,700 | 143 | 191 |
| K | US$/KW | Capital cost | 1,100 | 1,100 | 600 | 400 | 400 |
| | | Actual Power generated/ Maximum possible P. generation | 0.68 | 0.68 | 0.68 | 0.33 | 0.44 |
| E | KWhr/KW | Annual electrical production (full load hours) | 6,000 | 6,000 | 6,000 | 2,856 | 3,828 |
| r | % | Interest rate per annum | 0.08 | 0.08 | 0.08 | 0.08 | 0.08 |
| n | years | Return period on investment | 20 | 20 | 20 | 20 | 20 |
| M/E | US $/KWhr | maintenance cost per KWhr | 0.002897 | 0.002062 | 0.001691 | 0.00267 | 0.00199 |
| F/E | US $/KWhr | Fuel cost per KWhr | 0.04366 | 0.04366 | 0.03894 | 0.00000 | 0.00000 |
| | | Electricity price Per KWhr | 0.06581 | 0.06497 | 0.05113 | 0.01737 | 0.01296 |

The area at the sea surface is a series of red major floats clearly visible during the day, and a series of flashing red navigation warning lights clearly visible at night.

The REWP System does not disturb marine life or sea utilization. For a 50 MW power plant, the area is 1,500 meters long, 22 meters wide, extending downward for 15 meters to the seabed as shown in the example. The underwater structures are pump casings that have an outside diameter of 23 cm spaced at 2.25 meters (C-C), and have variable depths of 15 meters or more, depending on seabed elevation.

Economic Analysis

A The average cost per KWH for a 50 MW REWP power plant varies between 1.296 and 1.737 cents per KWH depending on amount of generated KWH.

The fuel cost component per KWH varies between 3.89 and 4.366 US cents. As shown in Table 3 the cost per KWH depends on turbine type and fuel used. These figures are based on a fuel oil cost of US$ 208 per TOE (US$ 32/barrel of oil), and a NG cost of US$ 4,160 per million cubic feet. For the REWP, the fuel cost component per KWH is Zero.

Fuel cost savings per KWH for a REWP range between 3.894 and 4.366 US cents, per KWH, since the fuel cost for a REWP system is Zero.

Installation savings per KWH for a REWP range between US Cents 3.817 (5.113–1.296) and US Cents 4.844 (6.581–1.737).

Installation savings per KW for a REWP range between US$ 200 (600–400) and US$ 700 (1,100–400).

Note:
  Fuel Oil consumption 185 grams/KWH
  Fuel Oil Cost US$ 208/KTOE
  Fuel Oil Cost based on US$ 32/barrel
  NG Consumption 7.58 cubic foot/KWH
  NG Cost based on US$ 4,160/Mcubic foot KWH per year, with an installation cost of US$ 20,000,000 (at the rate of US$ 400 per KW), a life span of 20 years and a rate of return of 8%:

d. The maximum cost price per KWH is US Cents 1.737 compared with a minimum of US Cents of 5.113 per KWH for a conventional power plant. Therefore, there is a net profit of US Cents 3.376 per KWH. This translates into a net profit per year over and above the eight (8%) rate of return on invested capital as follows:
    US$ 4,827,680 for 143,000,000 KWH/year
    US$ 6,448,160 for 191,000,000 KWH/year

TABLE 4

Comparative data for electric power generation

| Technology | Size MW | Installed Cost. (US$/kW) | Elec. Efficiency LHV | Overall Efficiency | Total Maintenance Costs US$/KWH | Footprint sqft/kW | Emissions (gm/bhp-hr unless otherwise noted) Nox | CO |
|---|---|---|---|---|---|---|---|---|
| Recip. Engine: Diesel | 0.030-6+ | 600-1,000 | 30-43% | ~80-85% | 0.005-.015 | .22-.31 | 7-9 | 0.3-0.7 |
| Recip. Engine: NG | 0.030-6+ | 700-1,200 | 30-42% | ~80-85% | 0.007-0.020 | .28-.37 | 0.7-13 | 1-2 |
| Micro-turbine | 0.030-0.400 | 1,200-1,700 | 14-30% | ~80-85% | 0.008-0.015 | .15-.35 | 9-50 ppm | 9-50 ppm |
| Combustion Gas Turbine | 0.5-0.030+ | 400-900 | 21-40% | ~80-90% | 0.004-0.010 | .02-.61 | <9-50 ppm | <15-50 ppm |
| Fuel Cell | 0.100-3 | 4,000-5,000 | 36-50% | ~80-85% | 0.0019-0.0153 | 0.9 | <0.02 | <0.01 |
| Solar | | 43.7 | | | | | 0 | 0 |
| Diesel | | 20.9 | | | | | 0 | 0 |
| Off Shore Wind | | 11.4 | | | | | 0 | 0 |
| On Shore Wind | | 7.98 | | | | | 0 | 0 |
| Nuclear | | 7.98 | | | | | | |
| CCGT (Gas fired) | | 4.75 | 21-40% | 80-90% | 0.004-0.010 | 0.92-61 | <9-50 ppm | <15-50 ppm |
| REWP | 100 | 400 | | | 0.000753 | | 0 | 0 |

Financial Return and Undulation Incidence

Reduction in power generation due to maintenance shutdown is nil, since shutdown is scheduled during the months of calm seas. Therefore, the power generated is governed by undulation heights, incidence and duration.

Undulation height and duration depend upon the geographic location. To determine a factual figure for power generation, a log of the sea undulations as to heights and respective durations per year to be provided as shown in Table 2—REWP power generation and undulation heights.

For this feasibility study an REWP system with a capacity of 50 MW is assumed to provide between 143,000,000 and 191,000,000 KWH per year. That is, it operates at full capacity between 2,856 and 3,828 hours per year. That is, between 33% and 44% of full load capacity.

Financial Return—50 MW, 3 Meters Undulations a. The fuel savings per year for:
    143,000,000 KWH/year varies between US$ 5,568,420 and US$ 6,243,380 and for;
    191,000,000 KWH/year varies between US$ 7,437,540 and US$ 8,339,060
  b. The US$ 20 million capital investment for the 50 MW power plant is reclaimed in a 2½ to 3½ years, due to fuel savings alone.
  c. Alternately as shown in Table 1: For a 50 MW REWP power plant, generating a minimum total of 143,0000,000

Other Financial Rewards

Due to present laws for protecting the environment and maintaining a clean air, the US government gives an incentive equivalent to US Cents 0.96 for each KWH generated using a renewable energy source, such as: Solar, Wind, Sea, Geothermal, Organic or similar source of energy. This means that for a 50 MW REWP power plant there is: a yearly incentive ranging between US$ 1,372,800 and US$ 1,833,600.

The REWP provides a 1,500 meter long Floating Break Water Structure to protect shoreline erosion and provide calm seas for sea recreational areas.

What is claimed is:

1. The prior art of the record does not teach a supporting structure for a renewable Energy Wave Pump, as an aggregate apparatus and system, for changing the energy in a periodic surface undulation of an expanse body of fluid into usable form, with auto regulating controls as to surface elevations, undulation amplitudes and comprising; Hollow cylinder, perforated between pump cap and Disc, under water, anchored to the sea bed by including inter alias, a concentric suction check valve SCV connected to a floating hollow cylinder acting as a major float, by means of a rigid rod and a flexible line, that follows the fluid surface undulations and forces Disc and its suction check valve SCV to move up and down inside the cylinder, thus forcing a small volume of fluid from inside the cylinder to a discharge tube, at a higher head on the upward motion and refilling the cylinder with fluid on the downward motion of Disc, Discharge tube with a discharge check valve DCV connected and fixed to the hollow cylinder below Disc and SCV, discharges fluid from inside the hollow cylinder to a piping network feeding a common header and a stand pipe, directly to a hydro-turbo generator, to produce electric power and feed a private or public network.

* * * * *